(Model.)

J. W. SHULTS.
DENTAL PLATE.

No. 277,796. Patented May 15, 1883.

Witnesses:
Phil C. Dietrich
G. B. Harris.

Inventor:
J. W. Shults
By H. K. Johnson atty.

UNITED STATES PATENT OFFICE.

JOHN W. SHULTS, OF VAN WERT, OHIO.

DENTAL PLATE.

SPECIFICATION forming part of Letters Patent No. 277,796, dated May 15, 1883.

Application filed February 5, 1883. (Model.)

To all whom it may concern:

Be it known that I, J. W. SHULTS, a citizen of the United States, residing at Van Wert, in the county of Van Wert and State of Ohio, have invented certain new and useful Improvements in Dental Plates; and I do hereby declare the following to be a full, clear, and exact description of the invention, such as will enable others skilled in the art to which it appertains to make and use the same.

My invention relates to an improved process for forming dental plates, the object being to provide a dental plate with a hard-metal swaged palatal portion and a gum and lip portion cast onto said palatal portion, and to secure the teeth to said gum portion during the casting of the latter and without the aid of supplemental mechanical devices.

My improved process consists in arranging a swaged metallic palatal portion proper in a mold and applying a chemical flux thereto, to aid in uniting with said swaged portion a metallic gum and lip surface, and then pouring into said mold a molten alloy consisting of tin, silver, gold, and bismuth, to form both the gum and lip surfaces and to secure the teeth thereto without any supplemental mechanical devices.

The drawings represent perspective views of a dental plate constructed in accordance with my invention.

Figure 1:
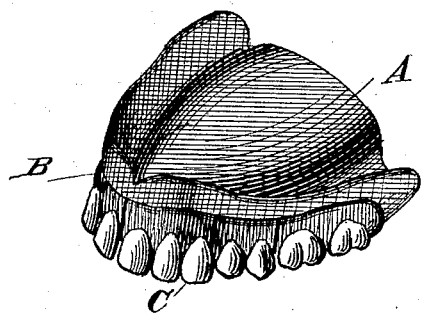
Figure 2:
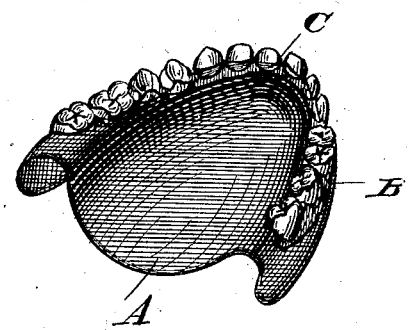

Figure 1 is a palatal and Fig. 2 a lingual surface.

A represents the palatal portion of the plate, formed by swaging.

B is the gum and lip surface, cast of an alloy of tin, silver, gold, and bismuth, and secured to the palatal portion and teeth by the process of casting.

C represents the teeth, secured in position by the process of casting the lip and gum portion B, said union of B and C taking place simultaneously with the union of A and B, which latter union is brought about by the use of said flux of muriate of ammonia in solution, and, during the process of casting the parts A, B, and C, form a perfect union of all the materials used in such a manner as to admit of electro-gilding or electroplating and the construction of a perfect plate. By the substitution of this chemical flux for the metallic flux in general use for uniting metals I am enabled to thoroughly electro-gild or electroplate the plates.

The alloy used in the construction of the plate is stronger, harder, and therefore more durable than the softer metals or alloys usually employed.

The electro-gilding or electroplating of the plates entirely avoids the injurious effects upon the plates and the soft tissues of the mouth of galvanic action produced by the contact of the saliva of the mouth with unplated or ungilded metal alloys.

The gold or silver plated dental plates as constructed by me possess all of the advantages of the ordinary gold plates, and may be made at a greatly-reduced expense. Again, said electro-gilded or electroplated dental plates are superior to vulcanized rubber plates or other plates made of plastic material in this, that the latter contain injurious coloring-matter and materials and are non-conductors of heat and cold, thus causing, in many instances, inflammation of the mucous membranes of the mouth, or too rapid absorption of the alveolar process or bone of the jaw.

I am aware that it is not new to electroplate dental plates, and I am also aware that it is not broadly new to form a dental plate with a hard metallic palatal portion and a soft-metal gum and lip surface secured to said palatal portion; hence I make no broad claim to such a plate. By my improved process the teeth are cast upon the gum and lip surface as the latter is formed, and with the avoidance of the employment of all supplemental mechanical devices for securing the teeth.

I claim—

The process of forming dental plates herein described, consisting in arranging a swaged metallic palatal portion proper in a mold and applying a chemical flux thereto, to aid in uniting with said swaged portion a metallic gum and lip surface, and then pouring into said mold a molten alloy consisting of tin, silver, gold, and bismuth, to form both the gum and lip surfaces, to secure the teeth thereto without any supplemental mechanical devices, and to afford a surface adapted to readily receive electroplating, as set forth.

In testimony whereof I affix my signature in presence of two witnesses.

JOHN WARD SHULTS.

Witnesses:
I. N. COLLINS,
H. M. CROW.